Figure 1:
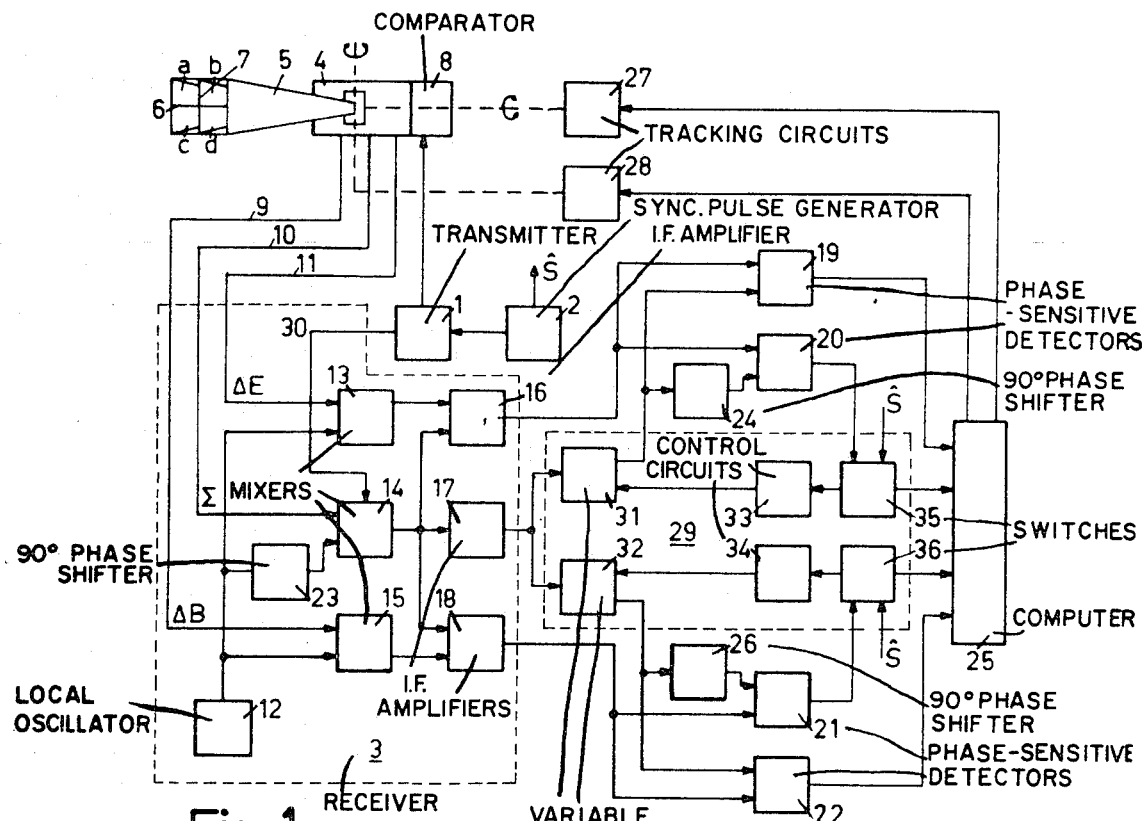

United States Patent [19]
van Popta

[11] 3,708,794
[45] Jan. 2, 1973

[54] MONOPULSE RADAR APPARATUS

[75] Inventor: Yftinus Frederik van Popta, Hengelo (O), Netherlands

[73] Assignee: N. V. Hollandse Signaalapparaten, Hengelo, Netherlands

[22] Filed: Dec. 29, 1969

[21] Appl. No.: 888,250

[30] Foreign Application Priority Data

Jan. 3, 1969 Netherlands ........................6900059

[52] U.S. Cl. ..............................343/7.4, 343/16 M
[51] Int. Cl. ................................................G01s 9/02
[58] Field of Search ............................343/7.4, 16 M

[56] References Cited

UNITED STATES PATENTS

| | | | |
|---|---|---|---|
| 3,196,433 | 7/1965 | Barton et al. | 343/7.4 |
| 2,914,762 | 11/1959 | Gross et al. | 343/16 M |
| 3,243,805 | 3/1966 | Smith, Jr. | 343/7.4 |
| 3,453,617 | 7/1969 | Begeman et al. | 343/7.4 |

Primary Examiner—Malcolm F. Hubler
Attorney—Frank R. Trifari

[57] ABSTRACT

A monopulse radar apparatus for automatically tracking a moving target by deriving error signals for operating the tracking circuits from composite signals formed from difference signals combined with the sum signal obtained from echo signals received within predetermined receiving patterns by means of a tracking antenna. The sum signal has a phase difference of 90° relative to the difference signals introduced into it. Each of the composite signals is fed to separate phase detecting sets, each comprising two phase detectors; the sum signal serving as a reference signal for the first phase detectors in each set and after compensation of the 90° phase difference, as a reference signal for the second phase detector in each set. The error signals are produced from the quotient of the output signals of the two phase detectors for each set.

3 Claims, 2 Drawing Figures

INVENTOR
YFTINUS F. VAN POPTA

BY
AGENT

MONOPULSE RADAR APPARATUS

The invention relates to a monopulse radar apparatus for automatically tracking a moving target, provided with a transmitter for transmitting pulses of high-frequency electromagnetic energy, a receiver adapted to receive echo signals in four receiving patterns, arranged symmetrically with respect to the radar symmetry axis, and also to convert said echo signals into a sum signal and two difference signals and to transform the latter signals to intermediate frequency, said receiver being also provided with a first, a second and a third intermediate frequency amplifier, a tracking circuit being further provided per angular coordinate, controlled by an error signal whose sign and magnitude are dependent on the amplitude and/or phase relation between the sum signal and one of the difference signals, said relation varying in accordance with the target deviation with respect to said radar symmetry axis.

In such a radar apparatus said amplitude and/or phase relation is usually realized by means of an automatic gain control. However, this method is subject to deviations from the correct amplitude and/or phase relation, the deviations being larger as the target echoes received are weaker. Said deviations are mainly due to relative differences in the intermediate frequency amplifiers.

A known solution for this problem is offered by designing the receiver such that one and the same intermediate frequency amplifier is used for the sum signal and the two difference signals. A receiver is known, for instance, effecting the intermediate frequency detection of the high-frequency signals received by means of oscillators of various frequencies and feeding the signals thus obtained to one and the same broad-band intermediate frequency amplifier. In another embodiment of the receiver the signals received are fed successively to one and the same intermediate frequency amplifier, via a delay line network and after intermediate frequency detection.

In another embodiment of the receiver the difference signals, after intermediate frequency detection, are modulated with oscillator signals shifted in phase through 90° with respect to each other and both modulated signals are added. The signal thus obtained, shifted in phase again through 90° is added to the intermediate frequency detected sum signal received. Here too, one and the same intermediate frequency amplifier will suffice.

Said methods, all aiming at a correct amplitude and/or phase relation, are based on the assumption that this desired effect can only be attained by making use of one single intermediate frequency amplifier.

However, receivers making use of one single intermediate frequency amplifier have the drawback that a number of additional measures must be taken, which make such receivers particularly complex.

It is the object of the invention to provide a monopulse radar apparatus in which the correct amplitude and/or phase relation is obtained in a simple and easily reproducible way.

According to the invention
two composite signals are obtained by adding each of the difference signals and the sum signal with a relative phase difference of 90°;
the sum signal is fed to the first intermediate frequency amplifier, whereas said composite signals are fed to the second or third intermediate frequency amplifier, respectively;
each of the signals corresponding to the output signals of the second and third intermediate frequency amplifier is fed to two phase-sensitive detectors, a signal corresponding to the sum signal serving as a reference signal for the first phase-sensitive detector, and after compensation of the above 90° phase difference as a reference signal for the second phase-sensitive detector, and whereby the above error signal is obtained from the quotient of the output signals of the two phase-sensitive detectors.

Figure 2:
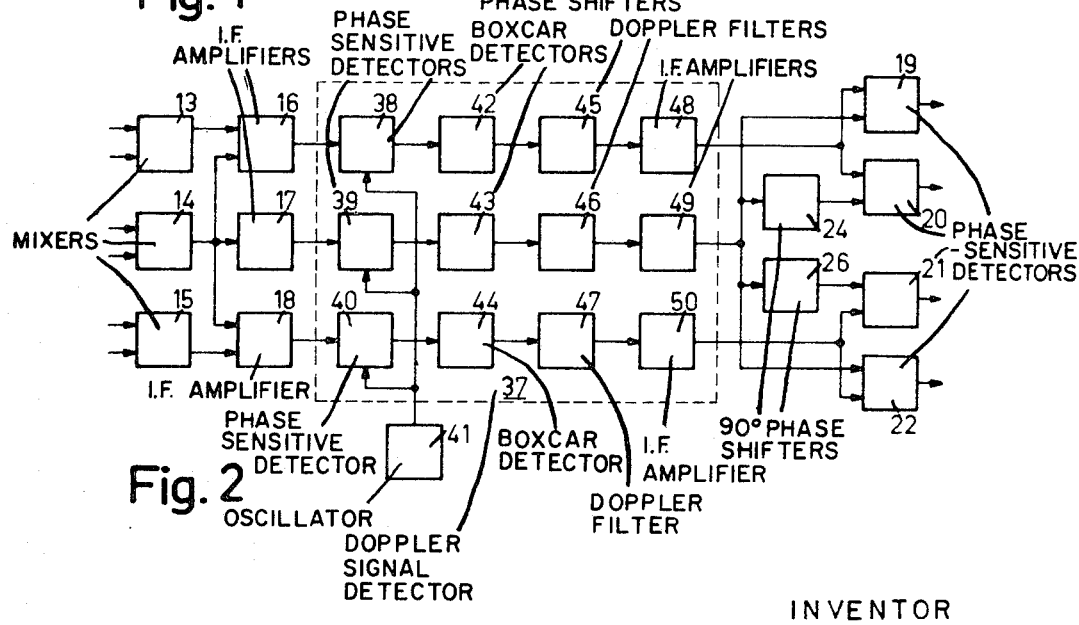

The invention and its advantages will be further explained by means of the figures, of which:

FIG. 1 shows a block diagram of a monopulse radar apparatus according to the invention, while FIG. 2 shows a block diagram of part of a second embodiment of a monopulse radar apparatus according to the invention.

Like parts in both figures are denoted by like numerals.

FIG. 1 shows the block diagram of a monopulse radar apparatus of the type based on the so-called sum and difference method and used to track a moving target. 1 denotes a transmitter, 2 a sync. pulse generator and 3 a receiver. The transmitter and the receiver are connected to an antenna system 4. The energy induced in the transmitter is transmitted via this antenna system in the pulse rhythm of the sync. pulses supplied by the generator 2. The monopulse radar apparatus, as shown in FIG. 1, is of the type based on amplitude comparison. Accordingly, the antenna system comprises a horn 5 divided by partitions 6 and 7 into four quadrants opening into a comparator 8. The comparator 8, which can be considered to belong to the receiver, serves on the one hand for adding and subtracting, respectively, the amplitudes of the energy received above and below partition 6, respectively, and on the other hand the amplitudes of the energy, received at the left and at the right of partition 7. Thus, if $a$, $b$, $c$ and $d$ represent the respective amplitudes of the electromagnetic energy that occur in the four parts of the horn as a result of a target echo received, this comparator supplies an elevation difference signal $\Delta E$ and an azimuth difference signal $\Delta B$, whose respective amplitudes can be represented by:

$$\hat{\Delta E} = (a+b) - (c+d) \text{ and}$$

$$\hat{\Delta B} = (a+c) - (b+d).$$

Moreover, comparator 8 supplies a signal which is proportional to the sum of the electromagnetic energy received in each of the four quadrants of the horn and whose amplitude can be represented by:

$$\hat{\Sigma} = (a+b+c+d).$$

If, as may be assumed, the target is a point target, the signals received in said horn quadrants have a relative equal phase and the difference signals may, independent from each other, be either in phase with or in phase opposition to the sum signal. The sign of the target deviation can be derived from this phase information. If, for instance, the difference signal $\Delta E$ is in phase with the sum signal $\Sigma$, i.e.: $(a+b) > (c+d)$, it follows that the target is above the symmetry-axis, whereas, if the difference signal $\Delta E$ is in phase opposition to the sum signal, i.e.: $(a+b) < (c+d)$, the target is below the symmetry axis. The difference $\Delta B$ can be considered in a similar way giving the sign of the deviation in azimuth.

The signals $\Delta B$, $\Sigma$ and $\Delta E$ are fed, via waveguides 9, 10 and 11, to receiver 3, in which they are mixed with a signal coming from local oscillator 12. For this purpose the receiver is provided with mixers 13, 14 and 15. Subsequently the intermediate frequency signals obtained are distributed among three intermediate frequency amplifiers 16, 17 and 18 provided in the receiver. The intermediate frequency signals thus amplified can be used to generate angular error signals required for controlling tracking circuits 27 and 28 by means of which the target is tracked in azimuth and elevation.

According to the invention two composite signals are generated for this purpose by joining the difference signal $\Delta E$ or $\Delta B$, respectively, and the sum signal $\Sigma$ with a relative phase difference of 90°, the sum signal $\Sigma$ is fed to intermediate frequency amplifier 17, while said composite signals are fed to intermediate frequency amplifiers 16 and 18, respectively, and each of the signals corresponding to the output signals of amplifiers 16 and 18 is fed to two phase-sensitive detectors 19, 20 and 21, 22 a signal corresponding to the sum signal serving as a reference signal for the phase-sensitive detector 19 or 22, respectively, while this signal, after compensation of the above-mentioned 90° phase-difference, serves as a reference signal for the phase-sensitive detector 20 or 21, respectively, and whereby each of said angular error signals is obtained from the quotient of the output signals of both phase-sensitive detectors 19 and 20, or 21 and 22, respectively.

For this purpose the receiver 3 is provided with a 90° phase-shifting element 23 in such a way that an intermediate frequency sum signal $\Sigma_{IF}$ is obtained that is 90° shifted in phase with respect to the obtained intermediate frequency difference signals $\Delta E_{IF}$ and $\Delta B_{IF}$. Of these intermediate frequency signals the sum signal $\Sigma_{IF}$ is fed to amplifier 17 and the composite signals obtained through the joining of the sum signal $\Sigma_{IF}$ and each of the difference signals $\Delta E_{IF}$ and $\Delta B_{IF}$ are fed to the amplifiers 16 and 18, respectively.

If the gain factors of amplifiers 16, 17 and 18 are denoted by $\alpha_1$, $\alpha_2$ and $\alpha_3$, respectively, the output signals of amplifiers 16, 17 and 18 can be expressed, respectively, by:

$$\alpha_1(\Delta E_{IF}+\Sigma_{IF}) = \alpha_1\{(a+b)-(c+d)\}\sin\omega_{IF}t + \alpha_1(a+b+c+d\pm\gamma)\cos\omega_{IF}t$$

$$\alpha_2\Sigma_{IF} = \alpha_2(a+b+c+d)\cos\omega_{IF}t$$

$$\alpha_3(\Delta B_{IF}+\Sigma_{IF}) = \alpha_3\{(a+c)-(b+d)\}\sin\omega_{IF}t + \alpha_3(a+b+c+d\pm\gamma)\cos\omega_{IF}t$$

The output signal of amplifier 16 is fed to both phase-sensitive detector 19 and to phase-sensitive detector 20. The output signal of amplifier 17 serves as a reference signal for detector 19, and after compensation of the introduced 90° phase difference, as a reference signal for detector 20. Said compensation takes place by means of a −90° phase-shifting element 24. Thus, the reference signal for detector 20 can be represented by:

$$\alpha_2\Sigma_{IF} = \alpha_2(a+b+c+d)\sin\omega_{IF}t.$$

The output signal supplied by detector 19 is that component from the signal fed by amplifier 16 that is in phase with the reference signal fed by amplifier 17. An examination of the above equations shows that this component is equal to:

$$\alpha_1(a+b+c+d).$$

Thus, this signal is proportional to the sum signal. The detector 20 handles the signals fed to it in a way analogous to detector 19; apparently a signal is obtained that is proportional to the amplitude of difference signal $\Delta E$, which is equal to:

$$\alpha_1\{(a+b)-(c+d)\}.$$

It will be clear from the above that the gain factor $\alpha_2$ of amplifier 17 is not at all important and that the amplitude ratio between sum signal $\Sigma$ and difference signal $\Delta E$ is also independent of the gain factor $\alpha_1$ of amplifier 16. Said amplitude ratio is realized by the computer 25 on reception of the required output signals from detectors 19 and 20. The amplitude ratio obtained can be expressed by:

$$[(a+b)-(c+d)]/(a+b+c+d)$$

and gives magnitude and sign of the elevation error signal used to control tracking circuit 27.

Similarly, the output signal of amplifier 18 is fed to phase-sensitive detectors 21 and 22; the output signal of amplifier 17 serves as a reference signal for the detector 22 and the output signal of amplifier 17 as a reference signal for detector 21, after the introduced 90° phase difference has been compensated by means of the −90° phase-shifting element 26. The output signals of phase-sensitive detectors 22 and 21 can be represented, respectively, by:

$$\alpha_3\{(a+c)-(b+d)\} \text{ and}$$

$$\alpha_3(a+b+c+d).$$

The amplitude ratio, determined from this by the computer, and which can be represented by:

$$[(a+c)-(b+d)]/(a+b+c+d)$$

gives magnitude and sign of the azimuth error signal, which is used to control tracking circuit 28.

In the above consideration it has been assumed that amplifiers 16, 17 and 18 only differ from each other in their gain factors. However, said amplifiers also appear to be capable of showing a different phase shift. Consequently, deviations occur from the introduced 90° phase difference between the sum signal and each of the difference signals. Apart from the above mentioned (correct output) signals the output signals of phase-sensitive detectors 19, 20 and 21,22 each contain a component shifted through 90°, which causes the amplitude ratios determined by the computer to differ from the above (correct) amplitude ratios. To prevent such deviations, the monopulse radar apparatus in the embodiment shown in FIG. 1 is provided with a circuit 29, containing the variable phase-shifting elements 31 and 32, the control circuits 33 and 34 and two switches 35 and 36.

In the time between the reception of successive echo signals a test pulse is injected into the sum channel at the input of the receiver. In the embodiment shown in FIG. 1 a fraction of the energy transmitted is used for this purpose. This energy is fed to mixer 14 via lead 30.

The intermediate frequency signal coming from mixer 14 is distributed among amplifiers 16, 17 and 18. If the difference in phase-shift between the amplifiers 16 and 18, respectively, and amplifier 17 is indicated by $\phi_1$ and $\phi_2$, respectively, the output signals of amplifiers 16, 17 and 18 are represented by:

$$\alpha_1 A \sin(\omega t + \phi_1),$$

$$\alpha_2 A \sin \omega t$$

$$\alpha_3 A \sin(\omega t + \phi_2),$$

where A represents the amplitude of the energy injected via lead 30. Now the phase-sensitive detectors 20 and 21 supply signals whose magnitude and sign depend on the differences in phase-shift between the amplifiers. The output signals of detectors 20 and 21 can be represented by:

$$\alpha_1 A \sin \phi_1 \text{ and}$$

$$\alpha_3 A \sin \phi_2$$

and are fed to control circuits 33 and 34, respectively, via switches 35 and 36, respectively. Said control circuits set the variable phase-shifting elements 31 and 32, respectively, in such a way that the output signal of amplifier 17 is subjected to a phase shift $\phi_1$ with respect to the output signal of amplifier 16 and a phase shift $\phi_2$ with respect to the output signal of amplifier 18.

In order to be able to perform such a phase control between the reception of successive echo signals, switches 35 and 36 should alternately supply the output signals of detectors 20 and 21 to control circuits 33 and 34 and computer 25. For this purpose the switches are controlled by sync. pulses S from generator 2.

In the embodiment of the monopulse radar apparatus as partly shown in FIG. 2, the intermediate frequency signals obtained and amplified are fed to a Doppler signal detector 37. The audio signals obtained in it correspond to the Doppler shift of the echo signals occurring as a result of the target movement. The Doppler signal detector consists, according to British Pat. No. 1,156,589 and British Pat. application Ser. No. 4,020/69, of phase-sensitive detectors 38, 39 and 40, to which the relevant intermediate frequency signal and a reference signal, coming from an oscillator 41 coherent with the transmitter frequency, are fed, and also of the boxcar detectors 42, 43 and 44 for stretching the output pulses of said detectors and Doppler filters 45, 46 and 47 connected to the outputs of the boxcar detectors and from which the audio frequency output signals are derived. The audio signals obtained are amplified in low frequency amplifiers 48, 49 and 50.

Relative differences in the gain factors of the low-frequency amplifiers, together with such differences occurring in the intermediate frequency amplifiers, are eliminated from the amplitude ratios obtained in a way similar to that in the embodiment shown in FIG. 1. In the embodiment meant here it is of great importance that the $-90°$ phase-shifting element 24 or 26, respectively, is so designed that the phase shift takes place practically independent of the Doppler frequencies detected.

We would finally remark that the phase difference between the sum signal and each of the difference signals can be realized in various ways, both by feeding the local oscillator signal to the 90° phase-shifting element in the way as indicated in FIG. 1, and by feeding the sum signal or each of the difference signals to said phase-shifting element. The phase difference is realized in either way prior to intermediate frequency detection. It will be clear that the phase difference can be introduced also after intermediate frequency detection but prior to the amplification.

What we claim is:

1. Monopulse radar apparatus for automatically tracking a moving target comprising a high-frequency pulse transmitter, a tracking antenna to receive echo signals within receiving patterns relative to predetermined axes, comparator means coupled to said antenna for converting said echo signals into a sum signal and at least one difference signal, means for processing said sum signal and said difference signal to produce an i.f. sum signal and an i.f. difference signal, said i.f. signals having a 90° phase shift relative to each other, means for combining said i.f. sum signal and said i.f. difference signal to produce a composite i.f. signal, at least one set of first and second phase detectors for receiving said composite i.f. signal, said first phase detector having said i.f. sum signal serving as a reference signal to produce a first output signal, said second phase detector having said i.f. sum signal after compensation by a minus 90° phase shift serving as a reference signal to produce a second output signal, computing means for producing an error signal from said first and second output signals, said error signals having amplitudes and polarities representing target deviations from said axes, and tracking circuits controlled by said error signals for moving said tracking antenna in order to minimize said target deviations.

2. Monopulse radar apparatus as claimed in claim 1 further comprising a Doppler signal detector coupled between said combining means and said first and second phase detectors for receiving said composite i.f. signal and producing by coherent means an audio sum signal and a composite audio signal, the frequency of said signals corresponding to the Doppler shift of the echo signals occurring as a result of target movement, said composite audio signal being supplied to said first and second phase detectors, said first phase detector having said audio sum signal serving as a reference to produce a first output signal, said second detector having said audio sum signal after compensation by a minus 90° phase shift serving as a reference to produce a second output signal.

3. Monopulse radar apparatus as claimed in claim 1 further comprising means for injecting test pulses in the sum signal at the input to said processing means in the time between the reception of successive echo signals to cause signals to be supplied by said second phase detectors in event of deviations from the 90° phase difference between the i.f. sum signal and the i.f. difference signal, said monopulse radar apparatus further comprising a variable phase-shifting element coupled between said sum i.f. amplifier and said first and second phase detector and responsive to the signals supplied by said second phase detector to correct said phase deviation.

* * * * *

UNITED STATES PATENT OFFICE
CERTIFICATE OF CORRECTION

Patent No. 3,708,794    Dated January 2, 1973

Inventor(s) YFTINUS FREDERIK VAN POPTA

It is certified that error appears in the above-identified patent and that said Letters Patent are hereby corrected as shown below:

Column 3, lines 53 and 58 change "$(a+b+c\eta \pm y)$" to

-- $(a+b+c+d)$ --.

Signed and sealed this 29th day of May 1973.

(SEAL)
Attest:

EDWARD M. FLETCHER, JR.
Attesting Officer

ROBERT GOTTSCHALK
Commissioner of Patents